United States Patent
Furuya

(10) Patent No.: US 6,423,194 B1
(45) Date of Patent: Jul. 23, 2002

(54) GAS DIFFUSION ELECTRODE AND BRINE ELECTROLYTIC BATH

(75) Inventor: Nagakazu Furuya, 6-24-604, Kitaguchi 1-chome, Kofu-shi, Yamanashi 400-0024 (JP)

(73) Assignees: Nagakazu Furuya, Yamanashi; Toagosei Co., Ltd.; Mitsui Chemicals, Inc., both of Tokyo; Kaneka Corporation, Osaka, all of (JP)

( * ) Notice: Subject to any disclaimer, the term of this patent is extended or adjusted under 35 U.S.C. 154(b) by 0 days.

(21) Appl. No.: 09/674,004

(22) PCT Filed: Feb. 24, 2000

(86) PCT No.: PCT/JP00/01074
§ 371 (c)(1),
(2), (4) Date: Oct. 24, 2000

(87) PCT Pub. No.: WO00/50668
PCT Pub. Date: Aug. 31, 2000

(30) Foreign Application Priority Data

Feb. 25, 1999 (JP) .......................... 11-048426
Feb. 25, 1999 (JP) .......................... 11-048427
Feb. 25, 1999 (JP) .......................... 11-048428
Mar. 18, 1999 (JP) .......................... 11-074132

(51) Int. Cl.$^7$ .......................................... C25B 11/00
(52) U.S. Cl. .................. 204/284; 204/277; 204/278
(58) Field of Search ............................ 204/283, 284, 204/258, 265, 266, 277, 278

(56) References Cited

FOREIGN PATENT DOCUMENTS

| JP | 9-41180 | 2/1997 |
| JP | 10-110286 | 4/1998 |
| JP | 10-158877 | * 6/1998 |

* cited by examiner

*Primary Examiner*—Bruce F. Bell
(74) *Attorney, Agent, or Firm*—Young & Thompson

(57) ABSTRACT

A gas diffusion cathode suitable for oxygen cathodes in an ion-exchange membrane type brine electrolytic bath, a gas diffusion cathode with a gas chamber and a brine electrolytic bath using it. A gas diffusion electrode is supported on a metal frame and gas diffusion electrode is joined to the metal frame via a silver member or a silver surface-carrying member. The joining portions are free from liquid or gas leakage, thereby to eliminate the need of a packing between the gas diffusion electrode and the electrolytic bath frame. At least two openings are provided in the metal frame and a gas diffusion electrode is joined by hot-pressing to each opening via a silver member or a silver surface-carrying member to provide a large gas diffusion electrode.

13 Claims, 13 Drawing Sheets

GAS DIFFUSION ELECTRODE AND BRINE ELECTROLYTIC BATH

TECHNICAL FIELD

This invention relates to a gas diffusion electrode suitable for use as an oxygen electrode of an ion-exchange membrane type sodium chloride electrolytic cell, etc. and a sodium chloride electrolytic cell using the electrode.

BACKGROUND ART

A cathode of a currently available ion-exchange type sodium chloride electrolytic cell is made of nickel and generates hydrogen in electrolysis. Replacement of this hydrogen-generating cathode with an oxygen cathode comprising a gas diffusion electrode requires an additional gas chamber, making three chambers in all. That is, the electrolytic cell comprises an ion-exchange membrane, a caustic soda aqueous solution (a liquid chamber), a gas diffusion electrode (an oxygen cathode), and a gas chamber in this order. These chambers are thin, desirably as thin as about 1 mm each. The desired thinness has imposed restrictions on the supply of gas and liquid, making it difficult to take measures against liquid and gas leakage.

The conventional sodium chloride electrolytic cell using the hydrogen-generating cathode can be supplied with caustic soda simply by attaching an inlet and an outlet to a catholyte chamber having a thickness of about 4 cm.

However, in the case of a sodium chloride electrolytic cell having an oxygen cathode, both the liquid chamber and the gas chamber must be constructed in the form of a layer as thin as several millimeters or less.

FIG. 23 is a cross section of an electrolytic cell using a conventional oxygen cathode. A flat gas diffusion electrode 1 is provided with a gas chamber 20 on one side (back side) thereof. The gas chamber 20 has a gas inlet 9. On the front side of the gas diffusion electrode 1 is provided a cathode chamber 18, which is sandwiched between the gas diffusion electrode 1 and an ion-exchange membrane 16. A cathode chamber frame forming the perimeter of the cathode chamber 18 is sealed with gaskets 17. An electrolytic solution inlet 19 is made through the cathode chamber frame.

That is, the cathode chamber 18 is formed by a metal frame 50 having a thickness of about 3 mm through which holes are pierced as an inlet and an outlet for an electrolyte, and a gasket 17 is inserted between the ion-exchange membrane 16 and the metal frame 50 and between the metal frame 50 and the gas diffusion electrode 1. The cathode chamber 18 having such a structure, it is impossible to make the cathode chamber 18 as thin as is required of an oxygen cathode. A thicker cathode chamber 18 results in an greater loss of electricity due to an increased resistance of the liquid so that the voltage of the electrolytic cell cannot be reduced.

(1) It is desirable for practical use that the thickness of the liquid chamber be 1 mm or smaller. Further, the electrolytic cell including the above-mentioned structure is complicated in structure, requiring an increased number of gaskets. The more the number of sealing parts, the more the likelihood of gas or liquid leakage. It has therefore been demanded to develop an electrolytic cell that is less likely to leak gas and liquid.

(2) In the above-described electrolytic cell, even through the inlet and the outlet for the catholyte are made as small as about 1 mm in diameter, it is still difficult to decrease the thickness of the cathode chamber frame to 2 mm or less because the frame should be prevented from deformation due to packing pressure. On the other hand, it is preferred for the inlet and the outlet to have a larger diameter to avoid clogging. From this viewpoint, it is obviously preferred for the cathode chamber frame to have a large thickness. The gasket preferably has a thickness of about 1 mm. These restrictions had led to the difficulty in making the cathode chamber thinner than 3 mm. Under the present situation, therefore, there is a loss corresponding to a voltage increase of 100 mV or more due to the electrolytic solution resistance. In order to reduce the resistance loss, it is necessary to make the catholyte chamber as thin as possible.

(3) In the cathode chamber of the conventional electrolytic cell, a gas chamber is provided to use a gas diffusion electrode as mentioned above. The gas chamber is pressed by the surroundings in intimate contact therewith so as to prevent gas leakage. Since the back side of the gas diffusion electrode is not joined, if higher than the gas pressure, the gas diffusion electrode protrudes easily and sometimes breaks. Further, electricity has been collected from the perimeter of the gas diffusion electrode. Where the liquid pressure is higher than the gas pressure, a gas feed layer is brought into contact under pressure with a metallic porous body used as a gas chamber material, and electricity is collected via the metallic porous body as an conducting path.

(4) A cathode used in an existing ion-exchange membrane type sodium chloride electrolytic cell is usually made of nickel, etc., and a hydrogen generating reaction proceeds on the cathode.

It has been deemed desirable to replace the hydrogen-generating cathode of an electrolytic cell with an oxygen cathode of which power saving is expected. In order to displace the hydrogen-generating cathode with an oxygen cathode, it is necessary to remodel the hydrogen-generating cathode and to set up a gas chamber in addition.

Where the remodelling for introducing an oxygen cathode into a conventional electrolytic cell is conducted by attaching thereto a gas diffusion electrode and a gas chamber pan which directly becomes a gas chamber and making an inlet and an outlet for oxygen gas, such alterations hardly achieve high precision, meeting difficulty in sealing between an electrolytic solution and gas. Under the present situation, it is easier to make a cathode frame from the start, which is bad economy.

In order to make use of an existing electrolytic cell, a means has been demanded with which the existing electrolytic cell can be remodelled with no or, if any, minimum alternations.

DISCLOSURE OF THE INVENTION (1) An object of the present invention is to provide a gas diffusion electrode attached to a metallic frame (metal-framed gas diffusion electrode) and a gas diffusion electrode and gas chamber which is based on the metal-framed gas diffusion electrode, with which a sodium chloride electrolytic cell little liable to leak liquid or gas can be construed; and a sodium chloride electrolytic cell using the same.

(2) An object of the present invention is to provide the above-described metal-framed gas diffusion electrode, wherein the surface of the gas diffusion electrode is brought closer to the ion-exchange membrane irrespective of the position of the metal frame thereby to make the cathode chamber sufficiently thin and to minimize the resistance loss due to the electrolytic solution resistance; a gas diffusion electrode and gas chamber which is based on this metal-framed gas diffusion electrode; and an ion-exchange membrane type sodium chloride electrolytic cell using the same.

(3) An object of the present invention is to provide a gas diffusion electrode which allows current collection directly from the back side thereof without using passage through a current collecting network inside the gas diffusion electrode as has been the case with the conventional element, of which the back side can be fixed at a number of points, which can be provided with gas passageways so that oxygen may sufficiently diffuse in the electrode, which enables current collection through a short distance to minimize a voltage loss, and which is not deformed and destroyed even if a difference between a liquid pressure and a gas pressure develops.

(4) In the state-of-the-art electrolytic cell in which the gas diffusion electrode is fixed to the electrolytic cell frame only at the periphery thereof, current is collected from the perimeter mainly through the current collecting network inside the gas diffusion electrode in the planar direction over a long distance. A structure has been demanded, such that a gas diffusion electrode does not protrude and break even if the gas pressure is higher than the liquid pressure.

The present invention has been made in the light of the above-described problems associated with the conventional technique. It is an object of the invention to provide a gas diffusion electrode which allows current collection directly from the back side thereof and which is not deformed or destroyed in the presence a difference between the liquid pressure and the gas pressure.

(5) In order to remodel a conventional electrolytic cell having a power-consuming metallic cathode into an electrolytic cell having an oxygen cathode, a means has been desired, with which replacement of a conventional cathode chamber with an oxygen electrode can be accomplished with as few alterations as possible to the existing electrolytic cell structure and at low cost.

An object of the invention is to provide an electrolytic cell which can be obtained by remodelling a currently available electrolytic cell with practically minimum alterations.

The present inventors have conducted various investigations to accomplish the above objects. As a result they have found that a gas diffusion electrode and a silver sheet can be joined so firmly as to prevent liquid leakage by hot pressing the gas diffusion electrode and the silver sheet that are superposed on each other under conditions of 200° C. to 400° C. and 20 kg/cm$^2$ or higher. They have also ascertained that silver sheets can be joined together firmly by hot pressing under conditions of 200° C. to 400° C. and 10 kg/cm$^2$ or higher.

The inventors have found that this technique enables them to attach a gas diffusion electrode to an anticorrosive metallic member. Based on this development, they have developed a technique of constructing an about 3 mm thick gas diffusion electrode and gas chamber inclusive of an about 1 mm thick gas chamber. Since a gas inlet and a gas outlet are provided independently of an electrolytic cell frame, gas can be piped with freedom of design, and it is easy to replace a conventional hydrogen-generating cathode with the gas diffusion electrode an gas chamber to construct an oxygen cathode type sodium chloride electrolytic cell free from a liquid or gas leak.

Next, in order for the gas diffusion electrode to approach the ion-exchange membrane as near as possible in an oxygen cathode type sodium chloride electrolytic cell, the anticorrosive metallic member of the invention, on which the gas diffusion electrode is held as described above, has such a structure that the surface of the gas diffusion electrode projects forward. In this manner, the distance of the metal-framed gas diffusion electrode from the ion-exchange membrane can be made extremely shorter.

Further, in connection with holding the gas diffusion electrode, the inventors have sought a means with which electric current could be collected directly from the back of a gas diffusion electrode while securing sufficient oxygen supply to the gas diffusion electrode. They have considered that joining a grooved metal sheet having a large number of grooves and projections to the back side of a gas diffusion electrode might provide a means with which the gas diffusion electrode could be fixed at a large number of points on its back while securing gas passageways through which gas flows freely. Although it is difficult to join a gas diffusion electrode and a metal sheet together, the inventors have found that the above object can be accomplished by making the projecting surfaces of the metal sheet of a silver material and hot pressing the silver material and the gas diffusion electrode. The present invention has been thus completed.

In the present invention, a gas diffusion electrode can be held by a metal frame, etc. firmly and with intimate contact so as not to cause liquid or gas leaks as mentioned above. A gas diffusion electrode and gas chamber which is free from liquid or gas leaks can be obtained accordingly. The gas diffusion electrode and gas chamber is applicable to an electrolytic cell, with its characteristics being taken advantage of.

An object of the invention is to provide an electrolytic cell structure which enables remodelling an electrolytic cell having a conventional gas-generating metal electrode by applying an oxygen cathode with substantially minimum alterations to the cell.

The present inventors have studied replacement of an existing cathode with a gas diffusion electrode by making nearly minimum alterations to the structure of the state-of-the-art electrolytic cell. They have noted the fact that the present cathode chamber using a hydrogen-generating cathode is wide enough because of such circumstances that: the distance between the cathode and the ion-exchange membrane is long in relation to hydrogen evolution; there is an unoccupied space in the rear of the cathode plate in case where, for example, an electrolytic solution is circulated in the chamber; and the like. The inventors have continued their study, expecting that a unit composed of a gas diffusion electrode, a gas chamber, a gas chamber pan, a gas inlet, and a gas outlet could be set as a cathode in a conventional cathode chamber even where the cathode chamber contains an electrolytic cell only if the unit perfectly seals out liquid, and reached the present invention.

That is, the above-described objects have been accomplished by the following means.

(1) A gas diffusion electrode supported by a metal frame which is characterized in that the gas diffusion electrode is joined to the metal frame via a silver member or a member having a silver surface.

(2) The gas diffusion electrode as described in item (1) above, characterized in that the metal frame is an anticorrosive metal frame having two or more openings and having a gas diffusion electrode joined to each of the openings via a silver member or a member having a silver surface by hot pressing.

(3) The gas diffusion electrode as described in item (1) above, characterized in that the metal frame is an anticorrosive metal frame having two or more openings and having a gas diffusion electrode joined to each of the openings via a silver member or a member having a silver surface by hot pressing to make a metal-framed gas diffusion electrode, and the metal-framed gas diffusion electrode has an electrode pan made of a nickel sheet joined thereto to make a gas chamber, the gas chamber being provided with a gas inlet and a gas outlet.

(4) The gas diffusion electrode as described in item (1) above, characterized in that the surface of the reaction layer of the gas diffusion electrode projects forward to form a projecting surface over the level of the periphery of the metal frame.

(5) The gas diffusion electrode as described in item (1) above, characterized by having a gas chamber-integrated structure, wherein the structure is obtained by applying a metal sheet having a silver surface with a large number of grooves to the gas diffusion electrode, with the projecting surfaces of the metal sheet where the silver surface exists being in contact with the gas feed layer side of the gas diffusion electrode, and joining the silver existing on the projecting surfaces of the grooved metal sheet to the gas diffusion electrode by hot pressing so that the grooves of the metal sheet serve as gas passageways.

(6) The gas diffusion electrode as described in item (5) above, characterized in that the joining is carried out under hot pressing conditions of a temperature of 200 to 400° C. and a pressure of 20 kg/cm$^2$ or higher.

(7) A sodium chloride electrolytic cell which is characterized in that a gas diffusion electrode is supported on a metal frame by joining the gas diffusion electrode to the metal frame via a silver member or a member having a silver surface; the gas diffusion electrode supported on the metal frame and an electrode pan made of a nickel sheet are joined to form a gas chamber; the gas chamber has a gas inlet and a gas outlet; and metallic joints of the gas diffusion electrode are bonded directly to a feeder rib and/or a cell frame of the electrolytic cell.

(8) The sodium chloride electrolytic cell as described in item (7) above, characterized in that the metal frame is an anticorrosive metal frame having two or more openings and having a gas diffusion electrode joined to each of the openings via a silver member or a member having a silver surface by hot pressing.

(9) The sodium chloride electrolytic cell as described in item (7) above, characterized in that the gas diffusion electrode supported on the metal frame has the surface of a reaction layer thereof projecting forward to provide a projecting surface over the level of the periphery of the metal frame.

(10) The sodium chloride electrolytic cell described in item (7) above, having a gas chamber-integrated type gas diffusion electrode which is constructed by applying a metal sheet having a silver surface with a large number of grooves to the gas diffusion electrode, with the projecting surfaces of the metal sheet where the silver surface exists being in contact with the gas feed layer side of the gas diffusion electrode, and joining the silver existing on the projecting surfaces of the grooved metal sheet to the gas diffusion electrode by hot pressing so that the grooves of the metal sheet serve as gas passageways.

(11) The sodium chloride electrolytic cell as described in item (7) above, characterized in that a cathode chamber is provided with an oxygen cathode composed of a gas diffusion electrode, a gas chamber, and a gas chamber pan and having a gas inlet and a gas outlet, and the cell is operated while a catholyte is existing on both the reaction layer side and the rear gas chamber side of the oxygen cathode.

The present invention will be described in detail, but it should be understood that the invention is not deemed to be limited to the following description.

The gas diffusion electrode usually comprises a current feeder, a reaction layer, and a gas feed layer in a laminate form. A silver net, silver-plated blowing nickel, etc. can suitably be used as a current feeder of the gas diffusion electrode. Mainly employed reaction layers include those comprising carbon black or a silver/PTFE mixture. Mainly employed gas feed layers include those comprising carbon black and PTFE. Various gas diffusion electrodes made of these materials can be used in the invention.

In carrying out the invention, a metallic frame and the gas diffusion electrode can be joined to each other by making use of the fact that firm joining is achieved by, for example, hot pressing via a silver sheet under conditions of 200° C. to 400° C. and 20 kg/cm$^2$ or higher. Where both of them are silver sheets, firm joining can be obtained by hot pressing under conditions, e.g., of 200° C. to 400° C. and 10 kg/cm$^2$ or more.

FIG. 1 is a plan view of a metal-framed gas diffusion electrode 4. Seeing that the electrode is upright in actual use, FIG. 1 is to be a front view but is treated herein as a plan for the sake of convenience in explaining the course of production.

There is a gas diffusion electrode 1 which is a laminate of a reaction layer, a silver net, and a gas feed layer. The periphery of the gas diffusion electrode 1 is hemmed by a silver frame 2 having a U-shape section. The gas diffusion electrode 1 hemmed by the silver frame 2 is supported by a metal frame 3 that is a nickel frame.

The metal frame 3 is a frame made of a nickel sheet having a thickness, e.g., of 1 mm. The surface of the nickel sheet is preferably plated with silver. Not all but only the area to which the silver frame 2 is joined could be plated with silver.

The gas diffusion electrode 1 to be joined is prepared by using an ordinary silver net as a current collector. The reaction layer and the gas feed layer are laminated with each other with their four sides even, and part of the silver net extend outward over the even edges of the reaction layer and the gas diffusion layer by about 5 mm. The extension of the silver net is folded back and superposed on the surface of the gas feed layer.

The silver frame 2 is prepared by bending a silver ribbon, e.g., 10 mm wide and 0.1 mm thick, along a line in the longitudinal direction which divides the ribbon in two halves so as to have a U-shape section across the width direction. The silver frame 2 bent in a U-shape is fitted around the periphery of the gas diffusion electrode comprising the laminate of the reaction layer, the silver net, and the gas feed layer.

The above-described metal frame (being made of nickel, also designated nickel frame 3) is joined to the gas feed layer side of the gas diffusion electrode 1 in such a manner that the gas diffusion electrode 1 is held on the surface of the nickel frame 3. That is, the nickel frame 3 is below the gas diffusion electrode 1 to support the gas diffusion electrode 1.

The gas diffusion electrode 1, the silver frame 2, and the metal frame 3 are joined together by putting the gas diffusion electrode 1 framed by the silver frame 2 on the nickel frame followed by hot pressing. The silver frame 2 is joined to the gas diffusion electrode 1 simultaneously.

A ribbon is used as a silver sheet in the above embodiment. In using the silver ribbon, the overlaps of the sheet should not be too thick. Care should be taken because liquid may leak from too thick overlapping parts. It is rather desirable that the silver frame 2 be a metal sheet worked into a rectangular frame surrounding the gas diffusion electrode.

While the above-described metal-framed gas diffusion electrode 1 has one gas diffusion electrode supported on one metal frame, the metal frame may have two or more openings, on each of which the gas diffusion electrode is supported.

FIG. 2 is a plan of another metal-framed gas diffusion electrode 4 according to the present invention.

This metal-framed gas diffusion electrode 4 is composed of gas diffusion electrodes 1 each comprising a laminate of a reaction layer and a gas feed layer, the periphery of the gas diffusion electrode being joined to a silver frame 2, and the periphery of the silver frame 2 being joined to a metal frame 3.

The metal-framed gas diffusion electrode 4 can be produced as follows. A plurality of windows (openings 5) whose lengths and widths are smaller than those of the gas diffusion electrode 1 by about 10 mm are made in the middle of a silver sheet whose size is larger than the gas diffusion electrode 1 to make a silver frame 2. A plurality of small windows are made in the middle of a metal sheet of the same size as the silver frame 2 to make a metal frame 3. The silver frame 2 is superposed on the metal frame 3 with the centers of the windows of the former agreeing with the centers of the corresponding windows of the latter. Gas diffusion electrodes 1 are superposed on the silver frame 2 so that one electrode is on one opening. The overlaps are hot pressed to join the three members all at once.

Hot pressing is preferably carried out at a temperature of 200° C. to 400° C. under a pressure of 10 to 100 kg/cm$^2$ whereby the gas diffusion electrode can firmly be fixed to the metal frame. There is thus prepared the metal-framed gas diffusion electrode 4 of the invention.

Timing for joining the gas diffusion electrode 1 and the metal frame 3 is of no concern. It is possible but involves complicated steps that a gas diffusion electrode of general conventional format is once completed, the silver frame 2 is joined to the periphery of the complete gas diffusion electrode, and the silver frame 2 is then joined to the metal frame 3. In the course of preparing the gas diffusion electrode, a silver framing material may be inserted between layers of a laminated sheet constituting the gas diffusion electrode and integrally joined with the sheet constituting the gas diffusion electrode through a nearly single hot pressing operation.

A large-sized metal-framed gas diffusion electrode can thus be produced.

In actual application, the metal-framed gas diffusion electrode is used as joined to, for example, a silver-plated nickel electrode pan. FIGS. 3 through 5 illustrate a gas diffusion electrode and gas chamber which is the metal-framed gas diffusion electrode with an electrode pan attached. FIGS. 3, 4 and 5 are a plan, a cross section seen from the front, and a cross section seen from the side, respectively, of the gas diffusion electrode and gas chamber.

As shown in FIG. 3, the metal-framed gas diffusion electrode 4 is superposed on a cathode pan 7 (not shown in FIG. 3, being on the reverse side), and the periphery and the inner framing parts of the metal-framed gas diffusion electrode 4 are joined to the cathode pan by hot pressing and weldering. The metal frame 3 is joined at the peripheries of the gas diffusion electrodes to the periphery and the framing parts of the cathode pan 7 to form a joint area 8. With the cathode pan 7 joined, there are formed gas chambers to make a gas diffusion electrode and gas chamber 11.

In the gas diffusion electrode and gas chamber 11, the band area of the metal frame 3 surrounding the co-planarly arranged metal-framed gas diffusion electrodes 4 is the joint area 8. As shown in FIGS. 4 and 5, the gas diffusion electrodes 1 are each disposed on the recess (gas chamber) of the cathode pan 7. The gas chambers shown in FIGS. 4 and 5 are filled with a metal net filler.

As shown in FIGS. 4 and 5, the metal-framed gas diffusion electrode 4 is superposed on the electrode pan made of a silver-plated nickel material (cathode pan 7), and the peripheral and the inside parts to be joined are hot pressed at 200° C. to 400° C. and 10 to 100 kg/cm$^2$ to form the joint 15. By hot pressing under such temperature and pressure conditions, the metal frame 3 is generally fixed firmly. Joining the metal-framed gas diffusion electrode and the electrode pan (cathode pan 7) can also be carried out by laser welding or continuous resistance welding.

Then the gas diffusion electrode and gas chamber is joined to a cathode feeder rib of a bipolar type sodium chloride electrolytic cell. FIG. 6 presents a cross section showing an example of the joining. Numeral 15 is a welded joint area between adjacent metal-framed gas diffusion electrodes.

The metal parts around the electrodes and the electrolytic cell frame can be joined by laser welding to make a liquid-leakproof structure. The feeder rib 14 supports a bipolar plate 13 in parallel to the metal-framed gas diffusion electrode 11 and has an anode DSA 12 in parallel to the bipolar plate 13. In FIG. 6, the joint area 15 has a joint member.

FIG. 7 is a cross section showing another example of joining the gas diffusion electrode and gas chamber to the feeder rib of a bipolar electrolytic cell. In this example the electrode pan (cathode pan 7) has recesses by sheet metal working. The manner of making the gas diffusion electrode and gas chamber 11 depends on the shape of the electrode pan. Making recesses in either the electrode pan 7 or the metal frame 3 facilitates the making. FIG. 6 represents an example in which the metal frame 3 is worked to have depressions, and FIG. 7 an example in which the cathode pan 7 is worked to have depressions. The electrode pan preferably has piping for gas to flow in and out and a gas reservoir for making the gas flow uniform as shown in FIG. 5. The gas piping is suitably of flexible plastics, rubber, flexible metal tubing. Couplers facilitate piping. Joining to the feeder rib 14 of a monopolar or bipolar electrolytic cell can be carried out at the joints between the metal frame 3 and the electrode pan 7. Direct bonding to the feeder rib can be performed by resistance welding or laser welding.

FIG. 22 is a cross section showing an example of the sodium chloride electrolytic cell according to the invention which is constructed by using the above-described gas diffusion electrode and gas chamber. This sodium chloride electrolytic cell is of bipolar type.

In FIG. 22, the above-described gas diffusion electrode and gas chamber having a cathode pan joined to the back side thereof is supported at both ends thereof by an anticorrosive frame.

An ion-exchange membrane 16 is provided in front of and in parallel to the gas diffusion electrode 1 with a small gas therebetween to form a cathode chamber 18. The cathode chamber 18 connects with a liquid chamber 49 of the frame. There is formed an electrolytic solution passage, in which the solution enters through an electrolytic solution inlet 19, flows through an opening 46 of a liquid chamber into the cathode chamber 18, enters the liquid chamber 49 through an opening 47 and exits from an electrolytic solution outlet 48.

The cathode pan on the back side of the gas diffusion electrode 1 is joined to a conductive rib 14, which is bonded to a bipolar plate 13 and supported thereby. The disposition of the conductive rib 14, being disposed in parallel to the paper while not seen in the Figure, is a portion containing the dotted circles. These circles are round holes made for the liquid flow and for weight reduction. An oxygen gas inlet 41 and an oxygen gas outlet 42 are provided in the upper part and the lower part of the gas diffusion electrode 1, respectively, to supply oxygen gas to the gas chamber of the gas diffusion electrode 1.

An anode DSA 12 is provided on the opposite side of the bipolar plate 13 via the conductive rib 14.

The gas diffusion electrode 1 and the anode DSA 12 are provided on each side of the bipolar plate 13. A plurality of this units are arranged to make up a bipolar electrolytic cell.

The metal-framed projecting gas diffusion electrode according to the present invention will then be illustrated by way of the drawings.

The plan view of the metal-framed projecting gas diffusion electrode is the same as FIG. 1 so that the drawing and its explanation are omitted here.

The silver frame 2 having a U-shaped section surrounds the periphery of the gas diffusion electrode 1 which is a laminate of the reaction layer, the silver net, and the gas feed layer, and the gas diffusion electrode 1 surrounded by the silver frame 2 is supported by the metal frame 3a (the nickel frame). Unlike the metal frame 3 shown in FIG. 1, the metal frame 3a is formed by working a 1 mm thick nickel sheet into a Z-shaped section as shown in FIG. 8, in which the sheet is bent stepwise to have a higher portion inward with an obtuse angle at the bends. The surface of the nickel sheet is plated with silver.

The gas diffusion electrode 1 is prepared by using a general silver net as a current collector. The reaction layer and the gas feed layer are laminated with each other with their four sides even, and part of the silver net extend outward over the even edges of the reaction layer and the gas diffusion layer by 5 mm. The extension of the silver net is folded back and superposed on the surface of the gas feed layer.

The above-described metal frame 3a, namely, the nickel frame is joined to the gas feed layer side of the laminate gas diffusion electrode 1 in such a manner that the gas diffusion electrode 1 is held on the surface of the nickel frame 3a. That is, the nickel frame 3a supports the gas diffusion electrode 1 so that the gas diffusion electrode 1 projects over the nickel frame 3a.

The gas diffusion electrode 1, the silver frame 2, and the metal frame 3a can be joined together under the aforementioned conditions.

A ribbon is used as a silver sheet in the above example. In using the silver ribbon, the overlaps of the sheet should not be too thick. Care should be taken because liquid may leak from too thick overlapping parts. It is rather desirable that the silver frame 2 be a metal sheet worked into a rectangular frame surrounding the gas diffusion electrode.

FIG. 9 illustrates the silver frame 2 surrounding the periphery. It is worked out of a rectangular silver sheet with a triangle 2a at each of its four corners cut off, and the central portion thereof punched to make a rectangular window which is slightly smaller in size than the gas diffusion electrode 1 to be attached. The silver frame 2 is put on the gas diffusion electrode 1 with the center thereof agreeing with the center of t he latter and with the four sides thereof parallel to those of the latter. The four sides of the silver frame 2 are then folded back so as to cover the periphery (four sides) of the gas diffusion electrode 1.

The current collector used in the gas diffusion electrode can be of any of a silver net, a silver porous body, a silver-plated nickel net, a silver-plated nickel porous body, and the like. Either of a silver-based material or a carbon-based material can be used. The silver sheet suitably has a thickness of 0.05 to 0.2 mm. While it is desirably made of pure silver, various silver alloys can be used in place of pure silver where hot pressing is conducted under high temperature and high pressure conditions. The metal frame 3 can also be of a silver-plated material (e.g., nickel), a silver-clad nickel sheet, and the like.

FIG. 10 is a cross section of the periphery of the cathode chamber of an ion-exchange membrane type electrolytic cell having a metal-framed projecting gas diffusion electrode 4a. The gas diffusion electrode is an oxygen cathode. An ion-exchange membrane 16 is held by gaskets 17. A cathode chamber 18 is formed between the ion-exchange membrane 16 and the projecting reaction layer side of the metal-framed projecting gas diffusion electrode 4a. An electrolytic solution inlet 19 is held at the end of the metal frame 3a of the metal-framed projecting gas diffusion electrode 4a between the ion-exchange membrane 16 and the electrode via the respective gaskets 17, enabling introduction of an electrolytic solution into the cathode chamber 18 in the direction of the arrow depicted in the Figure.

Gas chamber 20 is provided on the opposite side of the projecting reaction layer, i.e., on the gas feed layer side of the metal-framed projecting gas diffusion electrode 4a. The gas chamber 20 connects with a gas inlet 9.

The aforementioned gas diffusion electrode having a grooved metal sheet joined thereto will then be described.

In the gas diffusion electrode having a grooved metal sheet joined thereto, since the grooves of the metal sheet serve as gas chambers, there is provided as a whole a gas chamber-integrated type gas diffusion electrode.

The technical characteristics of the above-described gas chamber-integrated gas diffusion electrode will be described in detail based on the drawings.

In the drawings, members having the same function are numbered or symbolized in the same way, and repeated explanations are omitted here.

The metal sheet having a large number of grooves which can be used in the present invention can have various structures. Most typically, a metal sheet having an angular wavy form in its lateral section can be used as a metal sheet having a large number of grooves running in the vertical direction. The finer the wavy form, the better. It is preferred for joining to the gas diffusion electrode that the projections of the wavy form be flat. A metal sheet having such a section can easily be obtained by pressing. A metal plate having a large number of parallel grooves on its upper surface is also useful, which can easily be obtained by machining a metal plate. In order to increase the gas flow rate, the grooves may markedly wind, except for being parallel.

The grooves of the metal sheet is about 0.5 mm to 1 mm deep. The size of the grooves is such that suffices to supply gas. Within this restriction, it is preferred for the grooves be as shallow as possible so that the gas chambers may be thin, making the gas chamber-integrated gas diffusion electrode thin. As the breadth of the grooves becomes as small as ranges from about 0.5 mm to 1 mm, the area of the projections becomes larger to provide a larger contact area with the gas diffusion electrode. However, since the large area decreases the exposed area of the gas feed layer of the gas diffusion electrode, it is necessary to consider their balance.

The gas diffusion electrode and the gas diffusion electrode and gas chamber which have the grooved metal sheet attached to the back side thereof according to the present invention will be described specifically with reference to the drawings.

FIG. 14 is a cross-sectional illustration showing joining between a grooved metal sheet 25 having an angular wavy section and a gas feed layer 24 of a gas diffusion electrode 1 to form gas chambers 20.

The grooved metal sheet 25 is made by pressing a silver-clad nickel thin sheet. For example, a 0.5 mm thick nickel sheet cladded with 0.1 mm thick silver is press worked to form longitudinal wavy grooves having a depth of 1.2 mm at a pitch of 1.2 mm.

The gas diffusion electrode 1 is superposed on the grooved metal sheet 25 with its gas feed layer 24 down. The silver material 27 present on the projecting surface of the grooved metal sheet 25 is thus butted to the gas feed layer 24 of the gas diffusion electrode 1 and hot pressed under conditions of 200 to 400° C. and 20 kg/cm² or higher, whereby the silver material parts and the gas diffusion electrode are jointed together firmly. Since the metal sheet 25 having grooves 26 serving as gas passageways and a silver surface on the projections is hot pressed with the gas diffusion electrode 1 with the above action being taken advantage of, the gas feed layer 24 of the gas diffusion electrode 1 and the silver material 27 are bonded firmly. Gas chambers 20 are thus formed between the gas diffusion electrode 1 and the grooves 26. The grooves and the projections have a pitch of about 1 mm, current collection can be achieved through a minimum distance as shown. Even if a difference between a liquid pressure and a gas pressure develops, the electrode does not suffer from deformation, still less destruction. As depicted, gas is supplied from the gas chambers 20 through the gas feed layer 24 toward the reaction layer 23 of the gas diffusion electrode 1. During hot pressing, a spacer for preventing deformation is disposed as shown, thereby to form a firm joint area 28.

The silver material 27 may be one provided by plating or cladding with silver. The shape of the silver material 27 is of no concern. A specially thick silver member does not need to be present. An amount of silver sufficient for joining the metal sheet 25 and the gas diffusion electrode 1 by hot pressing will do.

FIG. 15 is a cross-sectional illustration showing joining a grooved metal sheet 25 and the gas feed layer 24 of a gas diffusion electrode 1 to form gas chambers 20 in case where a grooved work piece (grooved metal sheet) is used in place of the pressed sheet having an angular wavy section of FIG. 14.

In this case, a metal sheet is machined to make 1.2 mm deep longitudinal grooves 30 as shown in FIG. 16, and a silver material is adhered to the entire surface of the grooved side or at least the areas 28 which are to be joined to the gas feed layer 24 by an appropriate means such as laminating. As shown in FIG. 16, a lateral groove 31 is made in both the upper and the lower parts of the grooved metal sheet 25 to provide gas reservoirs through which the longitudinal grooves 30 (gas chambers) of the grooved metal sheet 25 connect with each other.

In the embodiment of FIG. 15, since the entire back surface of the grooved metal sheet is flat unlike in the embodiment of FIG. 14, firm joint areas 28 can be formed without particularly using a spacer 29 for preventing deformation in hot pressing.

The grooved metal sheet 25 can be made of silver sheeting but is preferably of silver-clad nickel material from the standpoint of strength and cost. In addition, a silver-clad copper material or a silver-laminated carbon material is also employable.

The current feeder used in the gas diffusion electrode suitably includes a silver net or silver-plated blowing nickel. Various gas diffusion electrodes can be used, such as those whose reaction layer 23 comprises carbon black or a silver/polytetrafluoroethylene (PTFE) mixture. The joint area 28 may be a gas feed layer 24 comprising a mixture of carbon black and PTFE, a silver current collecting net, fine silver particles, or a mixture thereof as long as it is a part of the gas diffusion electrode.

The silver sheet is superposed on the gas feed layer 24 of the gas diffusion electrode 1, and the overlapping parts are hot pressed at 200° C. to 400° C. and 10 to 100 kg/cm² to complete joining to the gas diffusion electrode 1. For reinforcing, a silver frame 32 made of a thin (0.1 mm) silver sheet may be provided on the periphery of the gas diffusion electrode 1 as shown in FIG. 17(a). In FIG. 17, (a) is a plan view of the uneven sheet-joined gas diffusion electrode according to the invention, (b) is a vertical section of the same, and (c) is a transverse selection of the same.

The following specifically illustrates an electrolytic cell which is obtained by remodelling an electrolytic cell having a conventional metal electrode by removing the metal electrode and setting the gas diffusion electrode and gas chamber according to the invention in the cathode chamber.

As stated previously, it has been found that, when a gas diffusion electrode and a silver sheet superposed on each other are hot pressed under conditions of 200° C. to 400° C. and 20 kg/cm² or higher, the silver sheet and the gas diffusion electrode are firmly joined together, and no liquid leaks occur from the joint area. Where both the members to be joined are of silver, firm bonding can be achieved by hot pressing. This principle can be applied to welding a gas diffusion electrode to an electrode pan via a silver sheet. These means can be applied to production of a gas diffusion electrode with a gas chamber. The metal cathode is removed from the cathode chamber of the conventional electrolytic cell, and the gas diffusion electrode and gas chamber is inserted into the wide cathode chamber, whereby an oxygen cathode can be set without making major alterations to the cathode chamber.

In the absence of a fear of liquid leakage, an electrolytic cell can be constructed, in which the gas diffusion electrode and gas chamber (oxygen cathode) is soaked in the catholyte.

In the electrolytic cell according to the invention, the electrolytic solution is made to flow from the top or the bottom thereof through the chamber between the ion-exchange membrane and the gas diffusion electrode and gas chamber. In some cases, the electrolytic solution moves into the rear of the gas diffusion electrode and gas chamber. A hydrogen gas collecting chamber, etc. of a conventional electrolytic cell may be made use of for introduction and withdrawal of the electrolytic solution.

Since the gas diffusion electrode and gas chamber is soaked in the electrolytic solution, the pressure applied to the electrode is all the same on the reaction layer side and the back side of the gas chamber. Therefore, no excessive stress is imposed onto the gas diffusion electrode, which allows use of such a thin nickel sheet (gas chamber pan) as has a thickness of 0.5 mm as a protection of the gas chamber. As a result, it is possible to make a gas diffusion electrode and gas chamber having a total thickness of not greater than 3 mm, which enables us to set an oxygen electrode in an existing electrolytic cell without making major alterations.

Specific examples of the electrolytic cell will be described with reference to the drawings.

FIG. 18 is a cross section showing a first embodiment of the electrolytic cell according to the invention. This embodiment represents a mode in which an electrolytic solution is fed from the top and runs down. In the electrolytic cell of this type, a bipolar plate 13 is set in the framework as a partition making a cathode chamber A and an anode chamber B. A feeder rib 21 is connected to the bipolar plate 13. The anode chamber B is provided with an anode DSA 12, and an oxygen cathode 32 is vertically fixed in the cathode chamber A by means of the feeder rib 21. The oxygen cathode 32 is fixed by welding the outer side of the gas chamber pan, which envelopes therein the gas diffusion electrode, to the cathode side feeder rib 21.

As shown in FIG. 21, the oxygen cathode 32 is composed of a gas diffusion electrode 1, a gas chamber 20, and a gas chamber pan 46 and has a gas inlet 33. The gas diffusion electrode 1 has a three layer structure in which a gas feed layer 24, a current feeder not shown, and a reaction layer 23 are laid in this order. The gas feed layer 24 and the reaction layer 23 are of a size with their four sides even. A silver net is chosen as the current feeder. The current feeder is slightly larger than the gas feed layer 24 and the reaction layer 23, having a 5 mm wide margin extending over the perimeter of the gas feed layer 24, etc. The extending margin is folded back to the reaction layer side and exposed there. The exposed part of the current feeder is covered with a silver frame 45. The reaction layer 23, the current feeder, and the silver frame 45 are joined by hot pressing to seal out gas and liquid.

A silver-made gas chamber pan 46 is fitted to the thus formed gas diffusion electrode 1 to surround the gas feed layer 24 side while forming a gas chamber 20 with the gas feed layer 24. The edge 44 of the gas chamber pan 46 is joined to the periphery of the above-described silver frame 45 hermetically.

As shown in FIG. 18, an ion-exchange membrane 16 is set in parallel with the oxygen cathode 32 on the side of the reaction layer laminated with the gas feed layer while leaving a space required as an electrolytic solution passage 35.

Liquid chambers 36 and 37 are fitted to the top and the bottom, respectively, of the oxygen cathode 32 which is fixed to the feeder rib 21 of the cathode chamber A. First to third electrolytic solution inlets or outlets are provided in the upper and the lower liquid chambers 36 and 37. The first inlet or outlet 38, the second inlet or outlet 39, and the third inlet or outlet 43 are inlets or outlets for an electrolytic solution. An electrolytic solution inlet or outlet 40 is provided in the rear of the oxygen electrode 32.

The electrolytic solution enters the upper liquid chamber 36 from the first inlet or outlet 38, flows from the liquid chamber 36 through the second inlet or outlet 39 down the passage 3S, flows to the reverse side of the oxygen cathode 32 from the lower part of the oxygen cathode 32 through the third inlet or outlet 43, and is discharged from an electrolytic solution inlet or outlet 40.

Such an ion-exchange membrane type sodium chloride electrolytic cell was made as follows. A silver net was used as a current feeder. A gas diffusion electrode 1 having the silver net as a current feeder exposed on the reaction layer side with a width of 5 mm was prepared. Then, the gas diffusion electrode 1 was attached to a gas chamber pan 46 via a silver frame 45 as shown in FIG. 21 by hot pressing to obtain a gas diffusion electrode and gas chamber. The gas diffusion electrode and gas chamber 1 can also be made by joining the silver sheet to the gas diffusion electrode followed by laser welding.

Two holes, an upper oxygen gas inlet 41 and a lower oxygen gas outlet 42, are made in the side of the cathode chamber frame of the electrolytic cell. These holes are led to the oxygen cathode 32 by piping and connected to an oxygen inlet 9 and an oxygen outlet 10, respectively, of the gas chamber 20. The oxygen cathode 32 is welded to the feeder rib 21 in the cathode.

Where an electrolytic solution is made to flow downward as shown in FIG. 18, a catholyte from the top of the electrolytic cell is made to run down between the ion-exchange membrane and the gas diffusion electrode and flow to the back side of the electrode through the gap at the bottom of the electrode. The catholyte is discharged from an outlet (inlet or outlet 40) which is provided in the rear of the oxygen cathode.

In case where an electrolytic solution is supplied from the bottom as shown in FIG. 19, it is made to rise between the ion-exchange membrane 16 and the gas diffusion electrode (oxygen cathode 32). The electrolytic solution may be made to flow in the rear of the electrode through the gap at the top of the electrode and then can be d is charged through the electrolytic solution outlet 40, the hole provided in the rear of the oxygen cathode.

The electrolytic solution enters the lower liquid chamber 37 through the inlet or outlet 38, rises from the lower liquid chamber 37 in the passage 35 between the ion-exchange membrane 16 and the oxygen cathode 32, enters the upper liquid chamber 36 through the electrolytic solution inlet or outlet 43 which is provided near the top of the oxygen cathode 32, and is discharged from the first inlet or outlet 38.

FIG. 20 is a cross section showing a third embodiment of the invention, wherein an electrolytic solution is made to flow in mainly from the electrolytic solution inlet or outlet 40 provide d in the rear.

The electrolytic solution flows in the cathode chamber A from the electrolytic solution inlet or outlet 40 and also from an inlet 38 of the lower liquid chamber 37, rises in a passage 35 between the oxygen cathode 32 and the ion-exchange membrane 16, enters the upper liquid chamber 36 through the upper second inlet or outlet 39, and is discharged from the first inlet or outlet 38.

The position of the electrolytic cell outlet is selected depending on the liquid pressure.

BEST MODE FOR CARRYING OUT THE INVENTION

Figure 1:
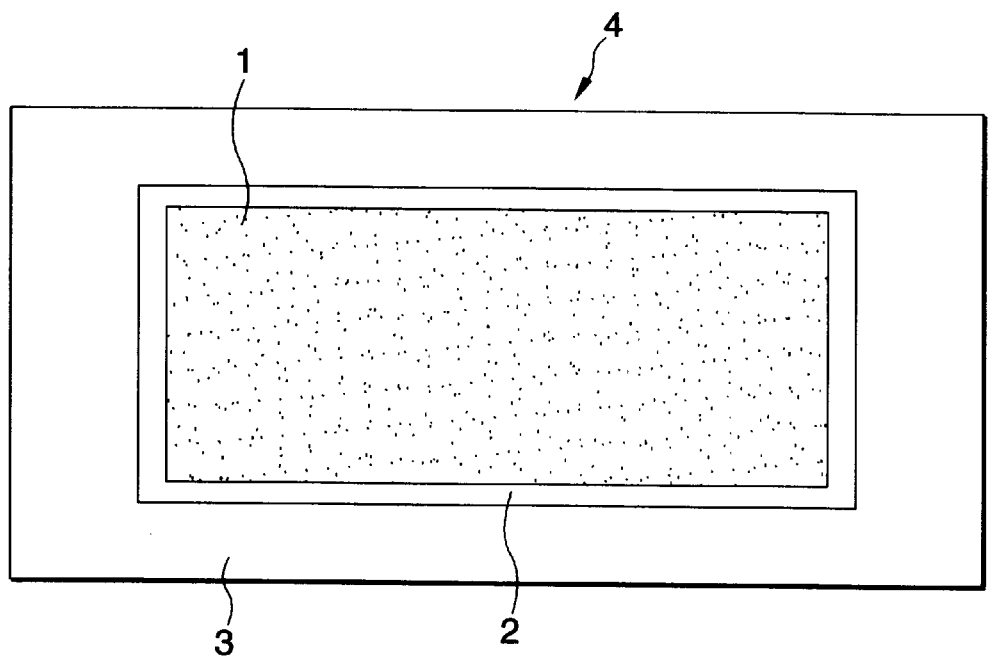
FIG. 1 is a plan view of a metal-framed gas diffusion electrode according to the invention.
Figure 2:
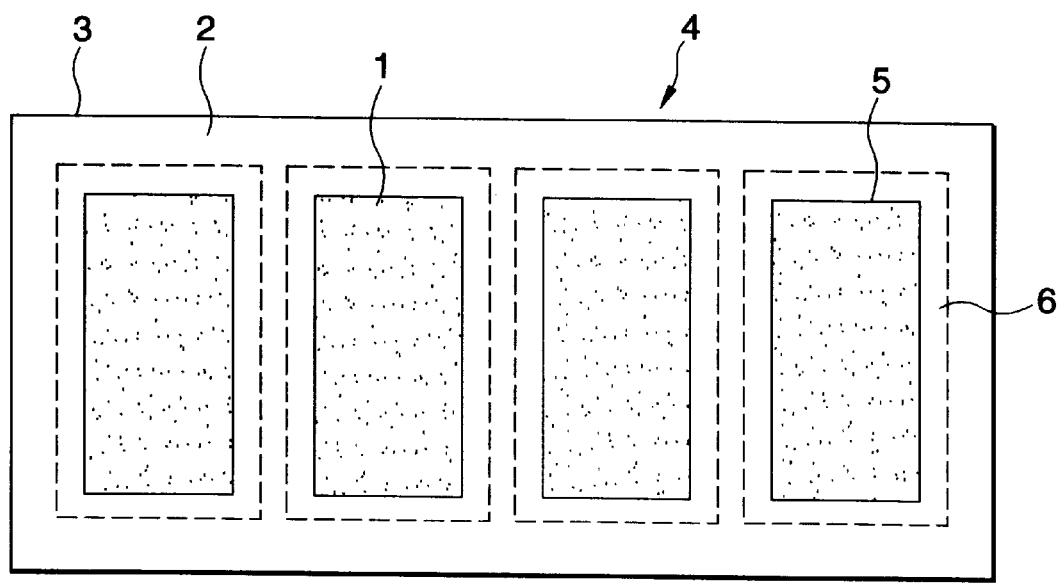
FIG. 2 is a plan view of a metal-framed gas diffusion electrode having a plurality of openings according to the invention.
Figure 3:
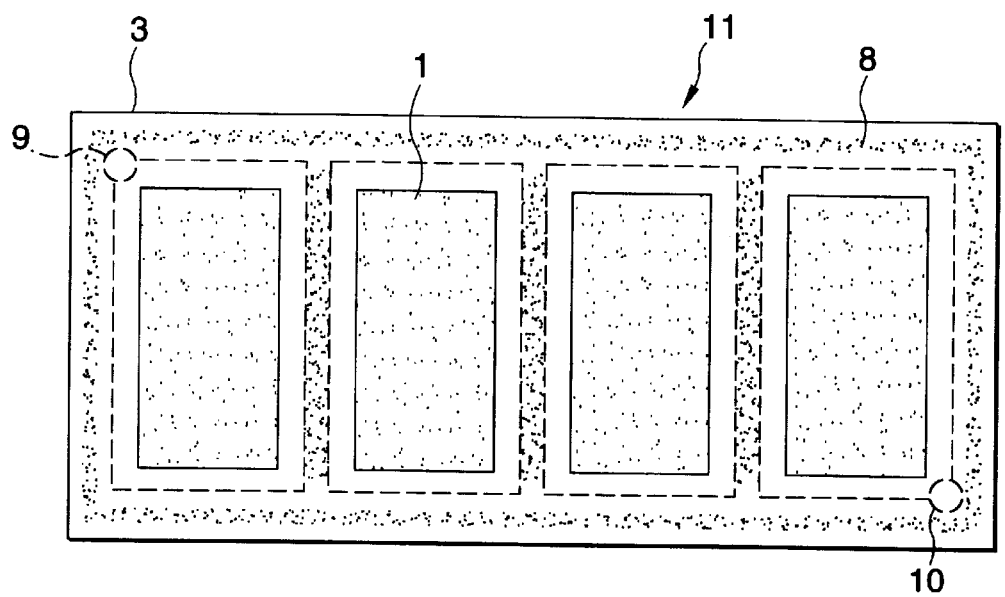
FIG. 3 is a plan view of a gas diffusion electrode and gas chamber according to the invention.
Figure 4:
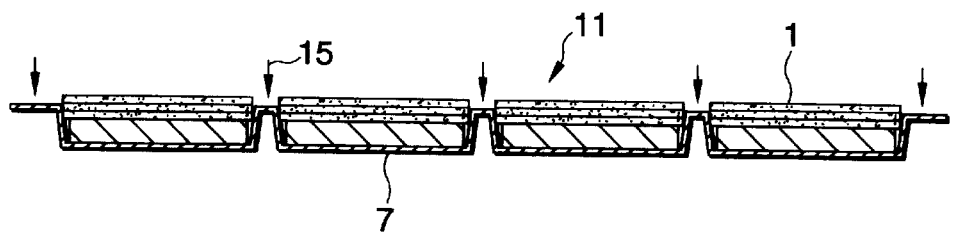
FIG. 4 is a cross section of the gas diffusion electrode and gas chamber according to the invention, seen from the front.
Figure 5:
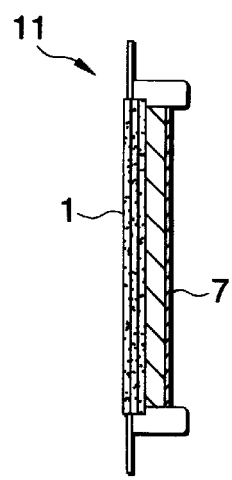
FIG. 5 is a cross section of the gas diffusion electrode and gas chamber according to the invention, seen from the side.
Figure 6:
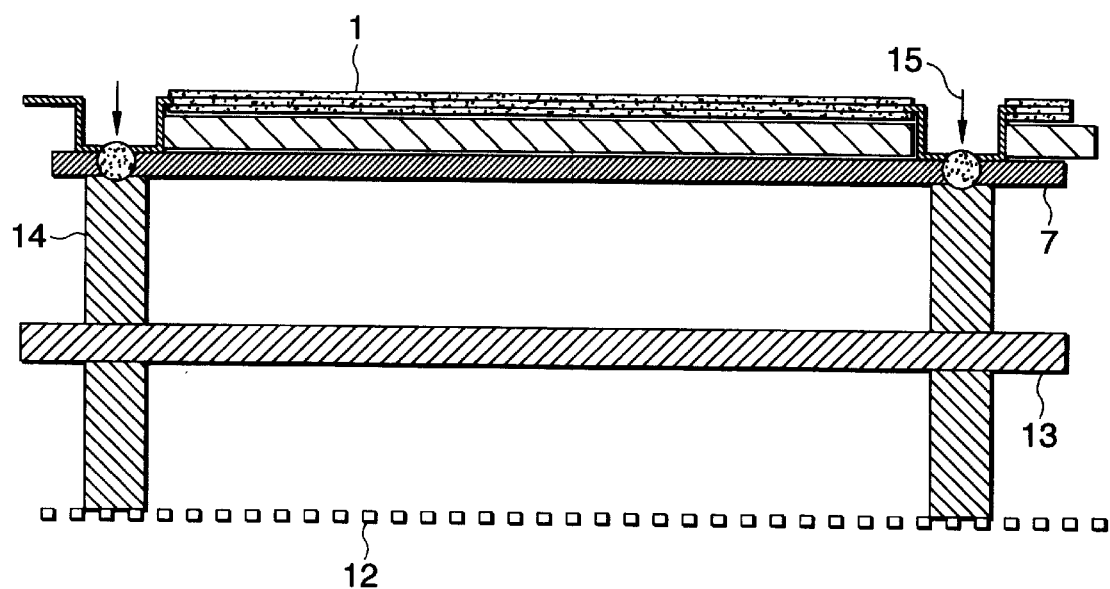
FIG. 6 is a cross section showing joining a gas diffusion electrode and gas chamber to a cathode feeder rib of a bipolar sodium chloride electrolytic cell.
Figure 7:
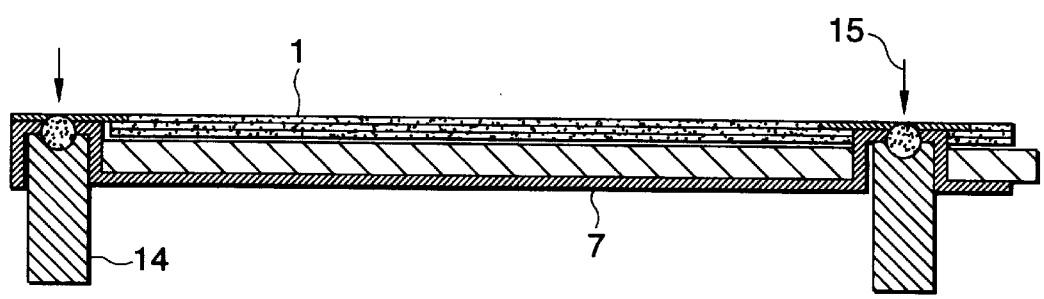
FIG. 7 is a cross section showing joining another gas diffusion electrode and gas chamber to a cathode feeder rib of a bipolar sodium chloride electrolytic cell.
Figure 8:
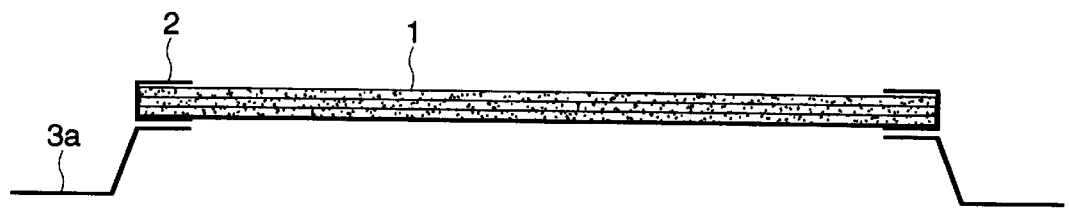
FIG. 8 is a cross section of a metal-framed projecting gas diffusion electrode according to the invention.
Figure 9:
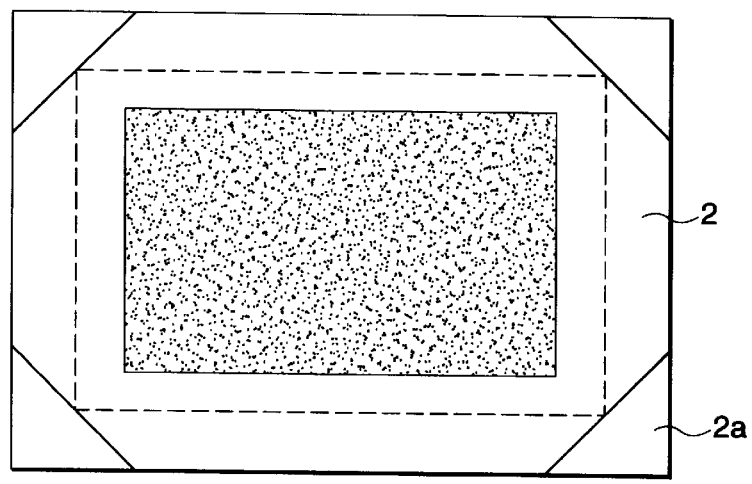
FIG. 9 is a plan of a metal-framed projecting gas diffusion electrode according to the invention which has the periphery thereof hemmed with a metal frame.

The present invention will now be illustrated in detail, but the invention is not construed as being limited thereto. Throughout the examples, all the parts and percents are by weight.

EXAMPLE 1

Reaction Layer Material:

To 200 parts of a 4% aqueous solution of Triton (surface active agent) was added 2 parts of hydrophobic carbon black (Denka Black available from Denki Kagaku Kogyo K.K.; average particle size: 390 A) and stirred to be dispersed. The resulting carbon black dispersion was further dispersed for 5 minutes in an ultrasonic dispersing machine (manufactured by Branson Ultrasonics Corp.; 500 W) while cooling with water, whereby the average dispersed particle size of the carbon black was reduced to 1.6 microns. To the dispersion was added 10 parts of colloidal silver (a trial product by Tanaka Kikinzoku K.K.; average particle size: 0.1 micron) and mixed by stirring. To the dispersion was further added 1.5 parts of a polytetrafluoroethylene (hereinafter referred to as PTFE) dispersion D-1 (average particle size: 0.3 micron, available from Daikin Industries, Ltd.) and mixed by stirring. The resulting dispersion was allowed to self-structure by addition of 300 parts of isopropyl alcohol, followed by filtration to prepare a material for a reaction layer.

Gas Feed Layer Material:

To 200 parts of water containing Triton (surface active agent) in a concentration of 4% was added 6 parts of hydrophobic carbon black (No. 6; average particle size: 490 A; available from Denki Kagaku Kogyo K.K.), followed by stirring over 10 minutes to disperse the hydrophobic carbon black. Four parts of a PTFE dispersion D-1 (average particle size: 0.3 micron; available from Daikin Industries, Ltd.) were further added and mixed by stirring. The resulting dispersion was allowed to self-structure by addition of 200 parts of isopropyl alcohol to prepare a material for a gas feed layer.

Reaction Layer-gas Feed Layer Laminate Sheet:

Solvent naphtha was added to each of the reaction layer material and the gas feed layer material, and a laminate sheet composed of a reaction layer and a gas feed layer was prepared by a rolling method. The laminate sheet was dried at 80° C. for 3 hours, and the surface active agent present was removed by means of an ethanol extractor. The sheet was further dried at 80° C. for 5 hours to obtain a gas diffusion electrode sheet (reaction layer-gas feed layer laminate sheet). A 121 cm by 21 cm rectangle was cut out of the gas diffusion electrode sheet.

Gas Feed Layer Sheet:

Separately, a gas feed layer sheet was prepared from the gas feed layer material and cut into the same size.

Silver-framed Gas Diffusion Electrode:

A 130 cm long, 70 cm wide and 0.2 mm thick silver sheet was punched to make three windows 120 cm long and 20 cm wide each to prepare a silver frame. A 122 cm long and 22 cm wide silver net (wire diameter: 0.1 mm; 50 mesh) was superposed on each window of the silver frame, and the overlaps were joined by hot pressing at a pressing temperature of 260° C. under a planar pressure of 40 kg/cm². The gas diffusion electrode sheet was placed beneath each of the silver nets, and the gas feed layer sheet was placed on each of the silver nets, and the layers were pressed under a pressure of 50 kg/cm² at a pressing temperature of 350° C. for 60 seconds to obtain a silver framed-gas diffusion electrode.

Metal-framed Gas Diffusion Electrode:

A metal frame was attached to the silver-framed gas diffusion electrode. The metal frame was prepared by making three 120 cm by 20 cm rectangular windows in a 130 long, 70 cm wide and 0.5 mm thick nickel sheet.

The frame was plated with silver to a deposit thickness of 5 microns. The silver-plated nickel frame and the silver-framed gas diffusion electrode were superposed on each other, and the overlaps were hot pressed at a temperature of 280° C. under a planar pressure of 60 kg/cm² to obtain a metal-framed gas diffusion electrode.

Gas diffusion Electrode and Gas Chamber:

A 130 cm long, 70 cm wide and 1 mm thick nickel plate was worked to have a 2 cm wide, 1 cm deep and 60 cm long gas reservoir on the upper and lower portion thereof and holes having a diameter of 1.2 cm as a gas inlet and a gas outlet.

A previously prepared electrode pan was plated with silver to a deposit thickness of 5 microns. A 1 mm thick corrugated nickel net was spot welded to the gas chamber of the electrode pan. The electrode pan and the metal-framed gas diffusion electrode were superposed on each other and joined by hot pressing by applying a planar pressure of 60 kg/cm$^2$ only to the peripheral portion and the portions to which a feeder rib was to be welded at a temperature of 250° C. for 60 seconds to obtain a gas diffusion electrode and gas chamber.

Electrolytic Cell:

Pipes for gas introduction and withdrawal were attached to the sides of a monopolar sodium chloride electrolytic cell, and the pipes from the gas diffusion electrode and gas chamber were connected thereto. The metallic parts of the gas diffusion electrode and gas chamber were spot welded to the feeder rib. The overlaps of the electrolytic cell frame and the metal frame were joined by laser welding to secure liquid leakproofness.

An electrolytic cell was set up, and sodium chloride electrolysis was carried out using the gas diffusion electrode as an oxygen cathode under conditions of 90° C., 32% NaOH, and 30 A/dm$^2$. The electrolytic cell was capable of carrying out electrolysis in a stable manner without a liquid leak. An electrolytic cell voltage of 2.05 V was obtained.

In this Example, a gas diffusion electrode and gas chamber which included a gas chamber and had a gas inlet and a gas outlet could be constructed with a thickness of about 3 mm. Because the gas inlet and the gas outlet were provided independently of the electrolytic cell frame, gas piping could be designed with freedom, and it was easy to displace a conventional hydrogen generating cathode with this gas diffusion electrode to construct an oxygen cathode type sodium chloride electrolytic cell free from liquid and gas leaks. By use of these techniques, there is obtained a very stable oxygen cathode which has a low resistance to electricity feed and liquid leakproofness even when it is fixed into an electrolytic cell, and electrolysis is performed for a long period of time.

EXAMPLE 2

Reaction Layer Material:

A reaction layer material was obtained in the same manner as in Example 1.

Gas Feed Layer Material:

A gas feed layer material was obtained in the same manner as in Example 1.

Gas Diffusion Electrode Sheet:

A gas diffusion electrode sheet in which a reaction layer and a gas feed layer were joined together was prepared in the same manner as in Example 1.

Gas Feed Layer Sheet:

A gas feed layer sheet was prepared from hydrophobic carbon black and a PTFE dispersion (40%) in the same manner as in Example 1. The gas feed layer sheet was cut into a size of 10.5 cm×20.5 cm.

Silver-framed Gas Diffusion Electrode:

A 50 mesh silver net having a wire diameter of 0.1 mm was cut into a 11 cm wide and 21 cm long rectangle. The gas diffusion electrode sheet, the silver net, and the gas feed layer sheet were superposed in this order and pressed at 350° C. and 50 kg/cm$^2$ for 60 seconds to obtain a gas diffusion electrode with the silver net exposed on the periphery of the gas feed layer side.

A 12 cm wide, 22 cm long and 0.1 mm thick silver sheet was prepared. A 10 cm wide and 20 cm long window was punched out of the central portion of the silver sheet, and the four corners were cut off in a triangular form 1 cm from the vertex. The gas diffusion electrode was put on the silver sheet, and the periphery of the silver sheet was folded back along lines making a 11 cm×21 cm rectangle to hem the four sides of the gas diffusion electrode with a frame of silver.

Metal-framed Gas Diffusion Electrode:

A metal frame was attached to the gas diffusion electrode hemmed with silver sheet. The metal frame was prepared by making a 10 cm wide and 20 cm long window in the central portion of a 15 cm wide, 25 cm long and 0.5 mm thick rectangular nickel sheet and having the central 11 cm wide and 21 cm long portion projecting over the other portion by about 5 mm.

The frame was plated with silver to a thickness of 5 microns. The silver-hemmed gas diffusion electrode was put on the silver-plated nickel frame, and the overlapping area was hot pressed under a planar pressure of 60 kg/cm$^2$ at a temperature of 280° C. to form a metal-framed projecting gas diffusion electrode.

Figure 10:
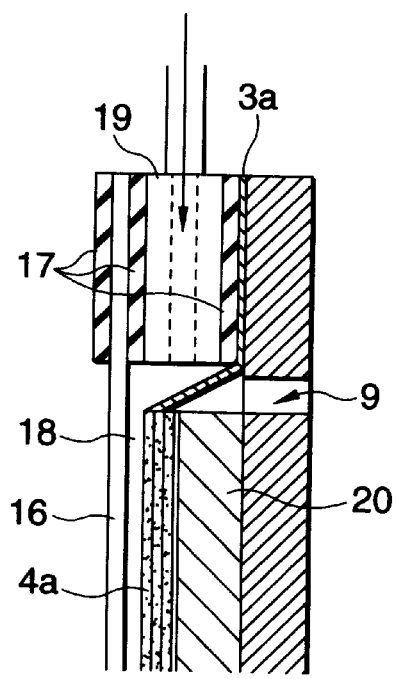
FIG. 10 is a cross section of the periphery of the cathode chamber of an electrolytic cell having incorporated therein a metal-framed projecting gas diffusion electrode according to the invention.

The resulting metal-framed projecting gas diffusion electrode was set in a conventional cathode chamber frame having a thickness of 5 mm to assemble an electrolytic cell having the structure shown in FIG. 10. It was confirmed that the electrolytic cell enabled stable electrolysis with no liquid leaks.

Sodium chloride electrolysis was carried out using the metal-framed electrode as an oxygen cathode. An electrolytic cell voltage of 1.95 V was obtained under conditions of 90° C., 32% NaOH, and 30 A/dm$^2$.

EXAMPLE 3

Figure 11:
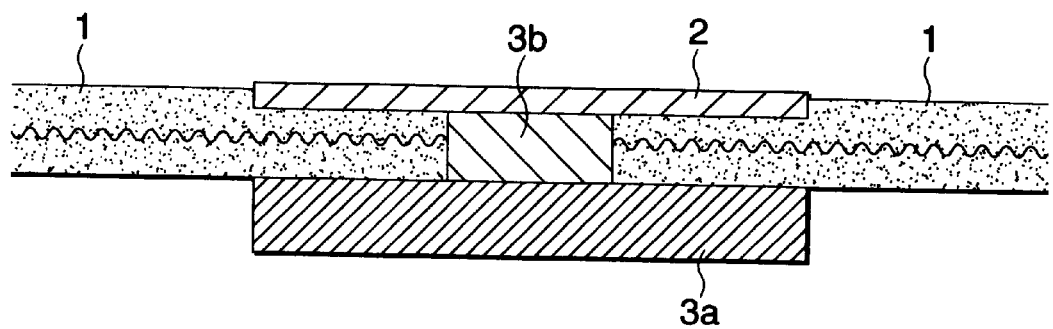
FIG. 11 is a cross section showing the joint connecting adjacent gas diffusion electrodes.
Figure 12:
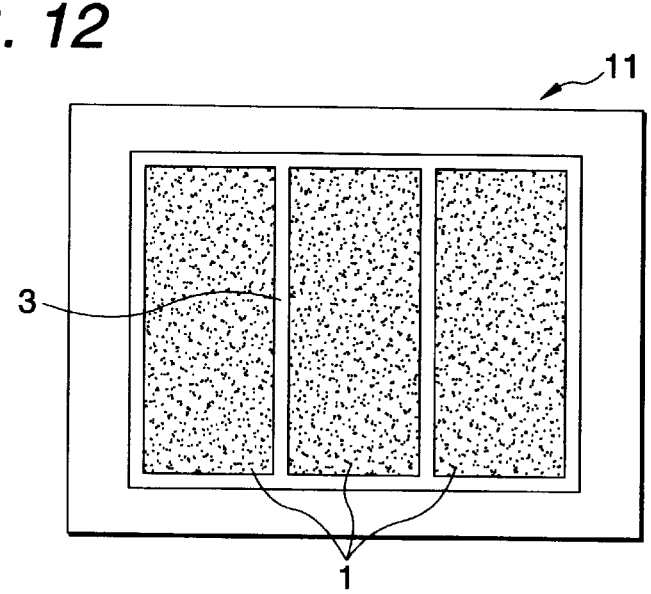
FIG. 12 is a plan of a metal-framed projecting gas diffusion electrode having three gas diffusion electrodes attached.

While the metal-framed projecting gas diffusion electrode prepared in Example 2 had one gas diffusion electrode joined, in Example 3 three gas diffusion electrodes 1 each having a length of 120 cm, a width of 19.5 cm and a thickness of 0.7 mm were prepared and linked to produce a large-sized metal-framed projecting gas diffusion electrode. FIG. 11 shows a cross section of the joint of adjacent gas diffusion electrodes 1. FIG. 12 is a plan of the metal-framed projecting gas diffusion electrode having three gas diffusion electrodes 1 joined thereto.

Three windows 119 cm long and 18.5 cm wide each were made through a 120 cm long and 60 cm wide silver sheet having a thickness of 0.15 mm to prepare a silver frame 2. Three windows 119 cm long and 18.5 cm wide each were made through a 130 cm by 70 cm silver-plated nickel sheet having a thickness of 0.5 mm to prepare a metal frame 3a. A 0.5 mm thick and 5 mm wide silver-coated nickel frame 3b was joined to the window framing part of the metal frame 3a as shown in FIG. 11. A gas diffusion electrode 1 was fitted into each window frame of the metal frame 3a having the silver-coated nickel frame 3b jointed thereto, and the silver frame 2 having three windows was superposed thereon. The layers were hot pressed at 350° C. under 50 kg/cm$^2$ for 60 seconds to prepare a metal-framed projecting gas diffusion electrode 11.

The metallic parts of the resulting metal-framed projecting gas diffusion electrode 11 are welded to the feeder rib of an electrolytic cell thereby to reduce feed resistance during electrolysis.

Figure 13:
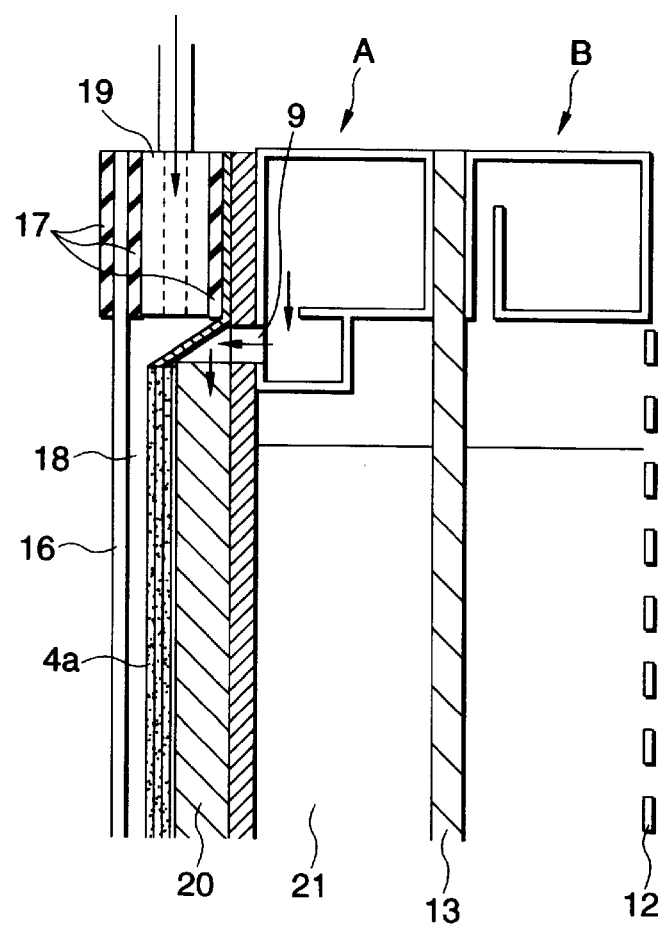
FIG. 13 is a cross section of the periphery of the cathode chamber of a bipolar electrolytic cell having incorporated therein a metal-framed projecting gas diffusion electrode.
Figure 14:
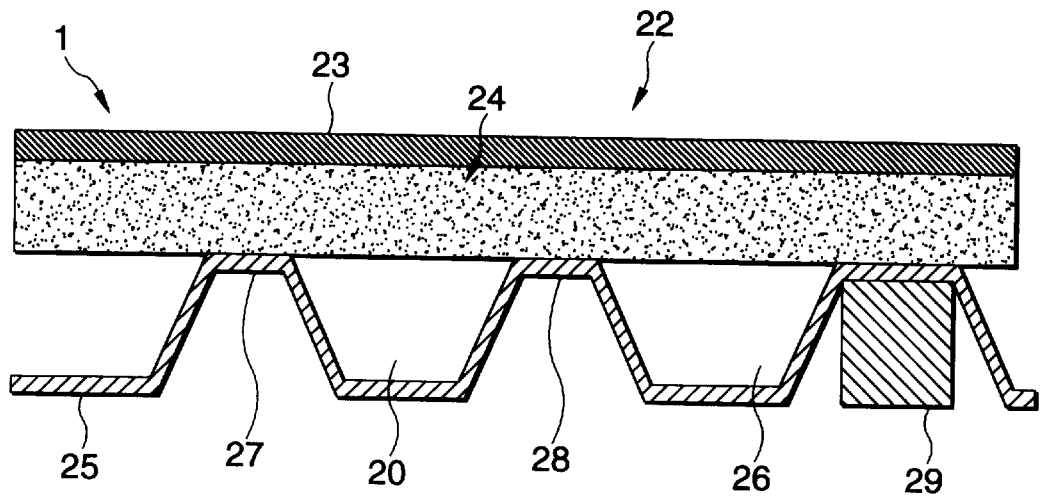
FIG. 14 is a cross-sectional illustration showing the essential part of one embodiment of an uneven sheet-joined gas diffusion electrode according to the invention.
Figure 15:
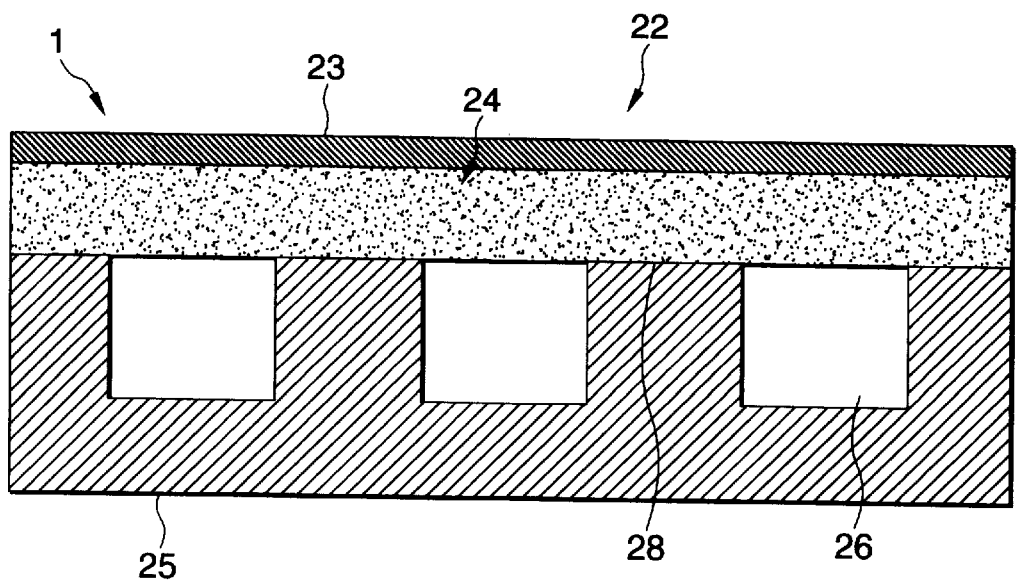
FIG. 15 is a cross-sectional illustration showing the essential part of another uneven sheet-joined gas diffusion electrode according to the invention in which a grooved sheet is used.
Figure 16:
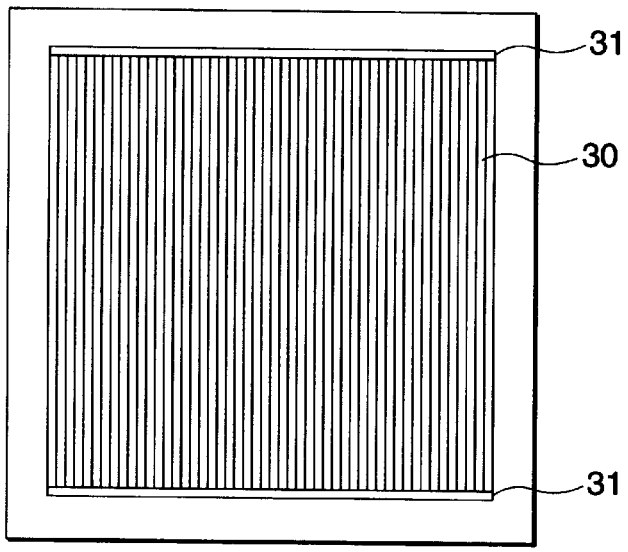
FIG. 16 is a plan view showing the groove configuration of a grooved metal sheet used in the invention.
Figure 17:
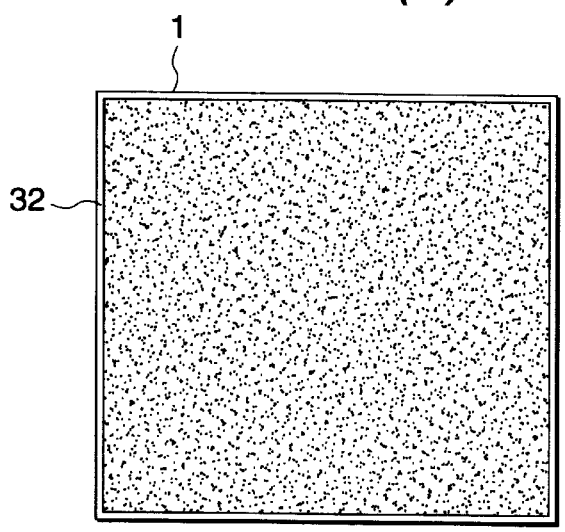
FIG. 17(*a*) is an overall plan view of an example of a gas diffusion electrode according to the invention, (b) is a vertical section of the same, and (c) is a transverse selection of the same.
Figure 17:
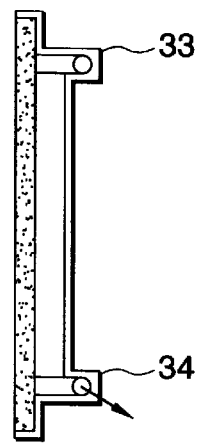
Figure 17:
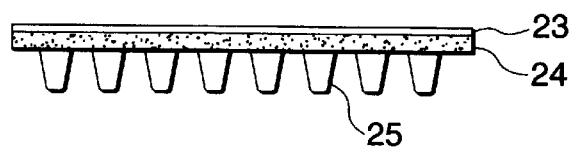
Figure 18:
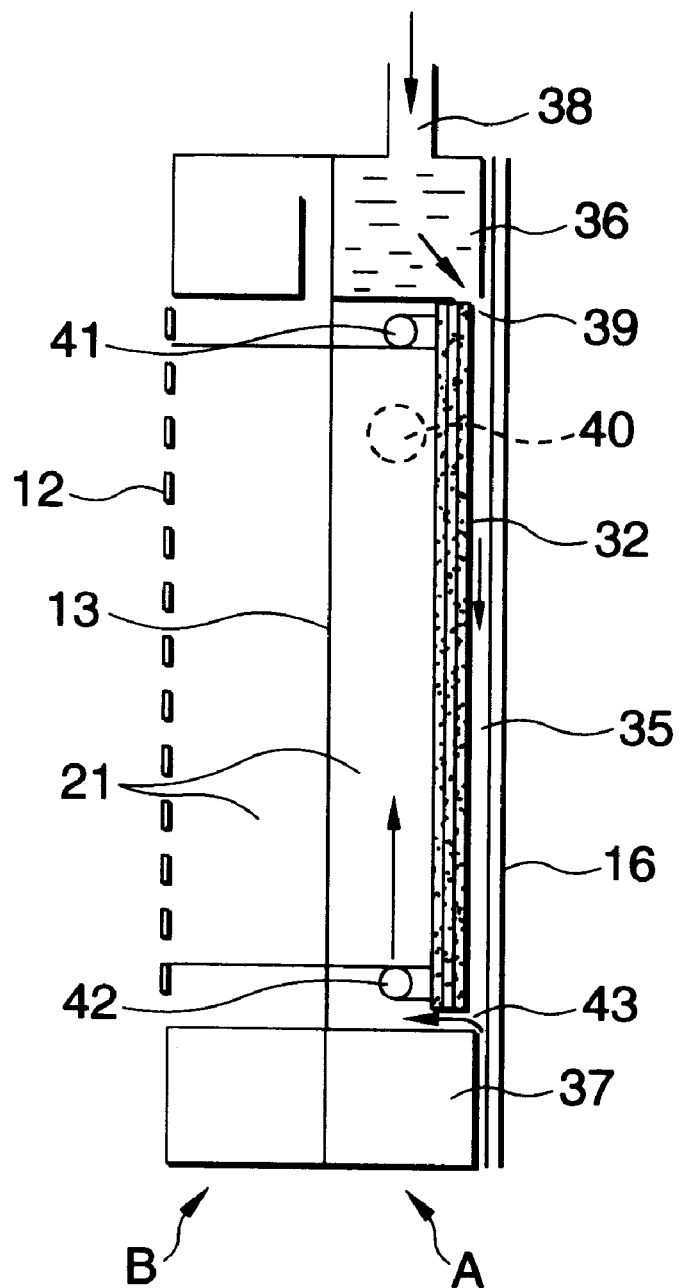
FIG. 18 is a cross section of an electrolytic cell using a gas diffusion electrode of the invention, wherein an electrolytic solution is made to flow from the top.
Figure 19:
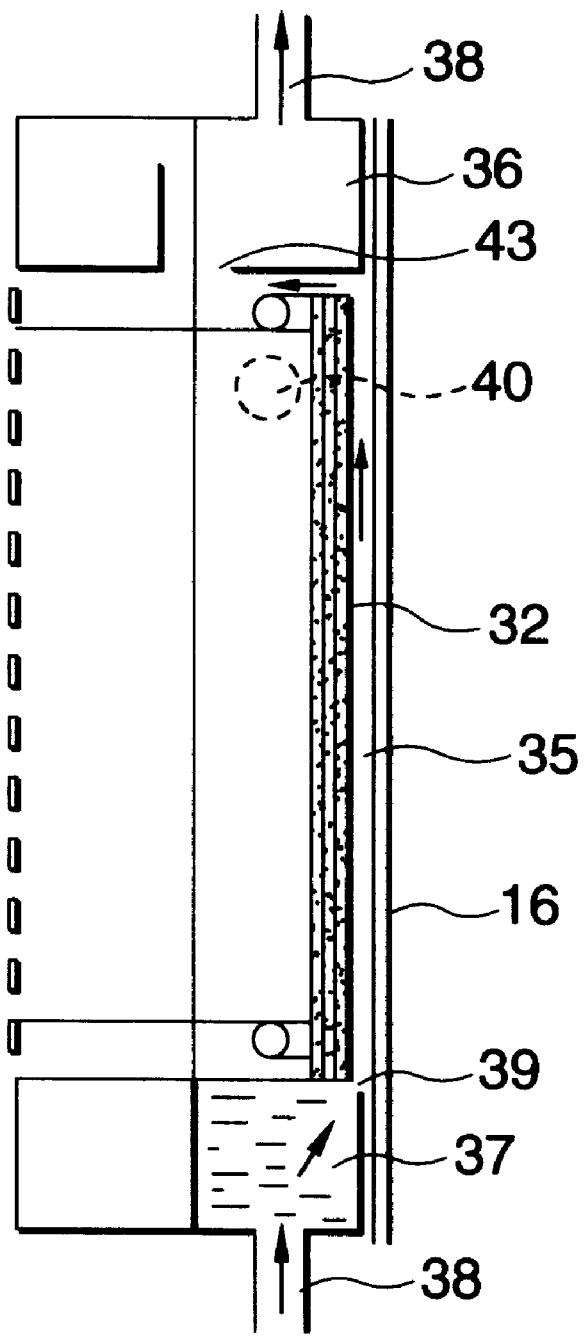
FIG. 19 is a cross section of an electrolytic cell using a gas diffusion electrode of the invention, wherein an electrolytic solution is made to flow from the bottom.
Figure 20:
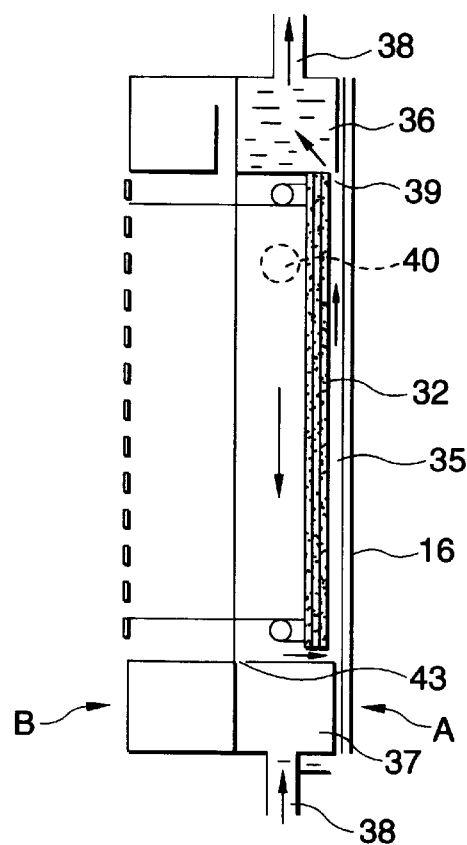
FIG. 20 is a cross section of an electrolytic cell using a gas diffusion electrode of the invention, wherein an electrolytic solution inlet is provided in the rear of the gas diffusion electrode.
Figure 21:
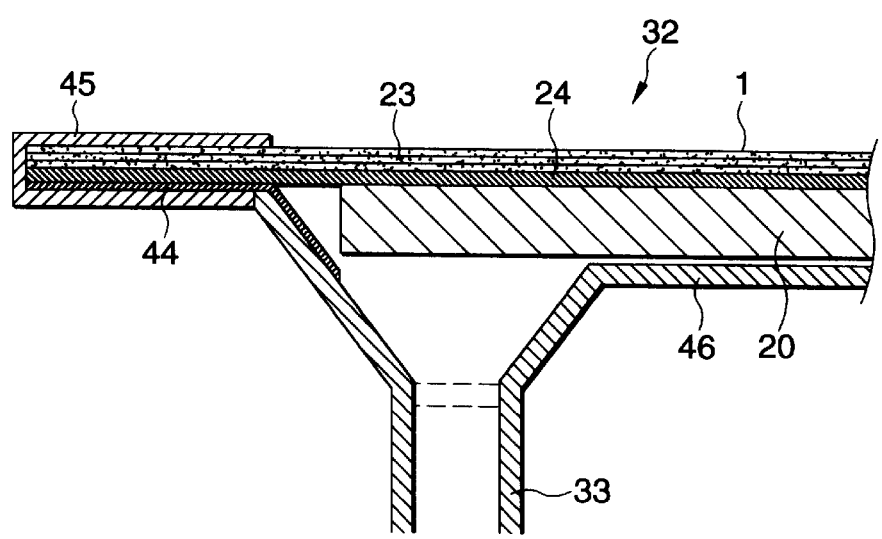
FIG. 21 is a cross section showing a partial structure of an oxygen cathode.
Figure 22:
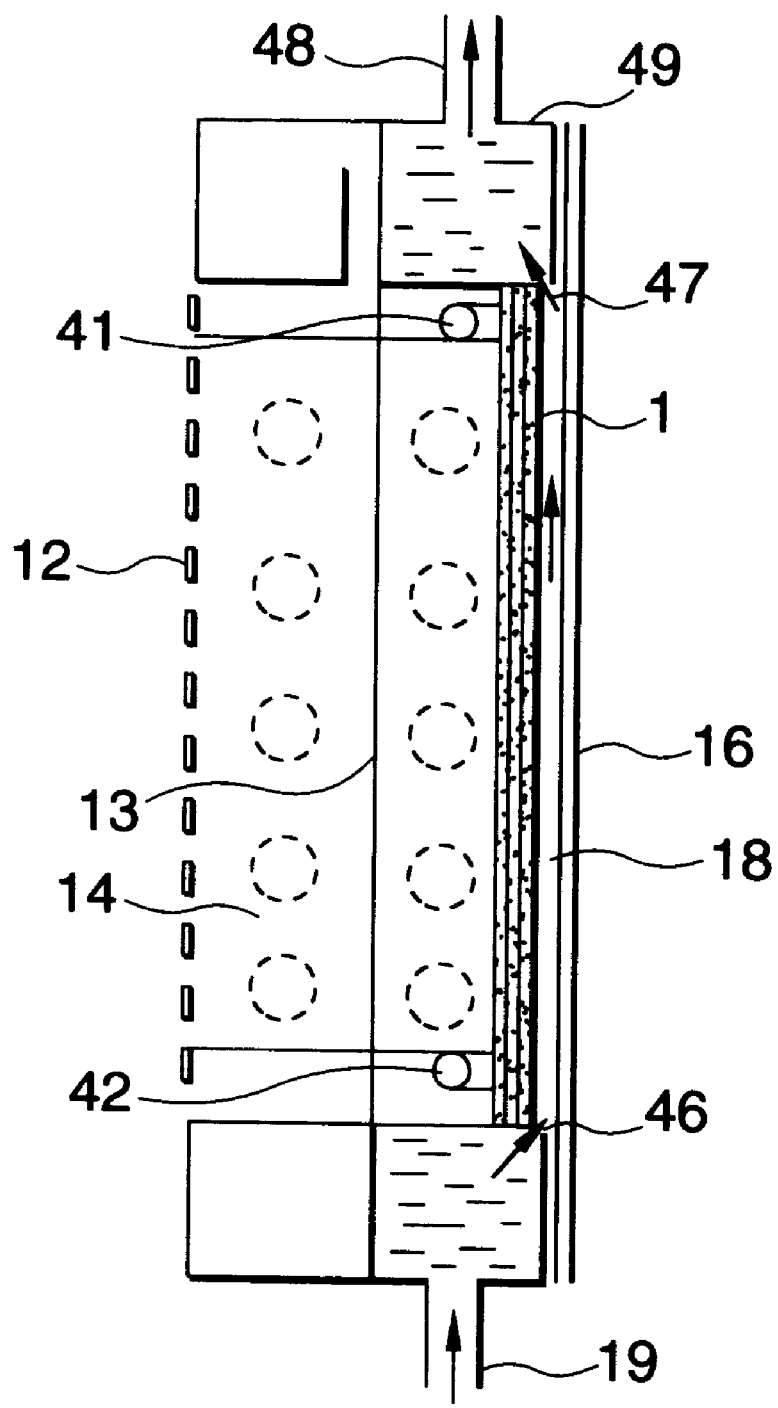
FIG. 22 is a cross section of an example of an electrolytic cell using a gas diffusion electrode and gas chamber according to the invention.
Figure 23:
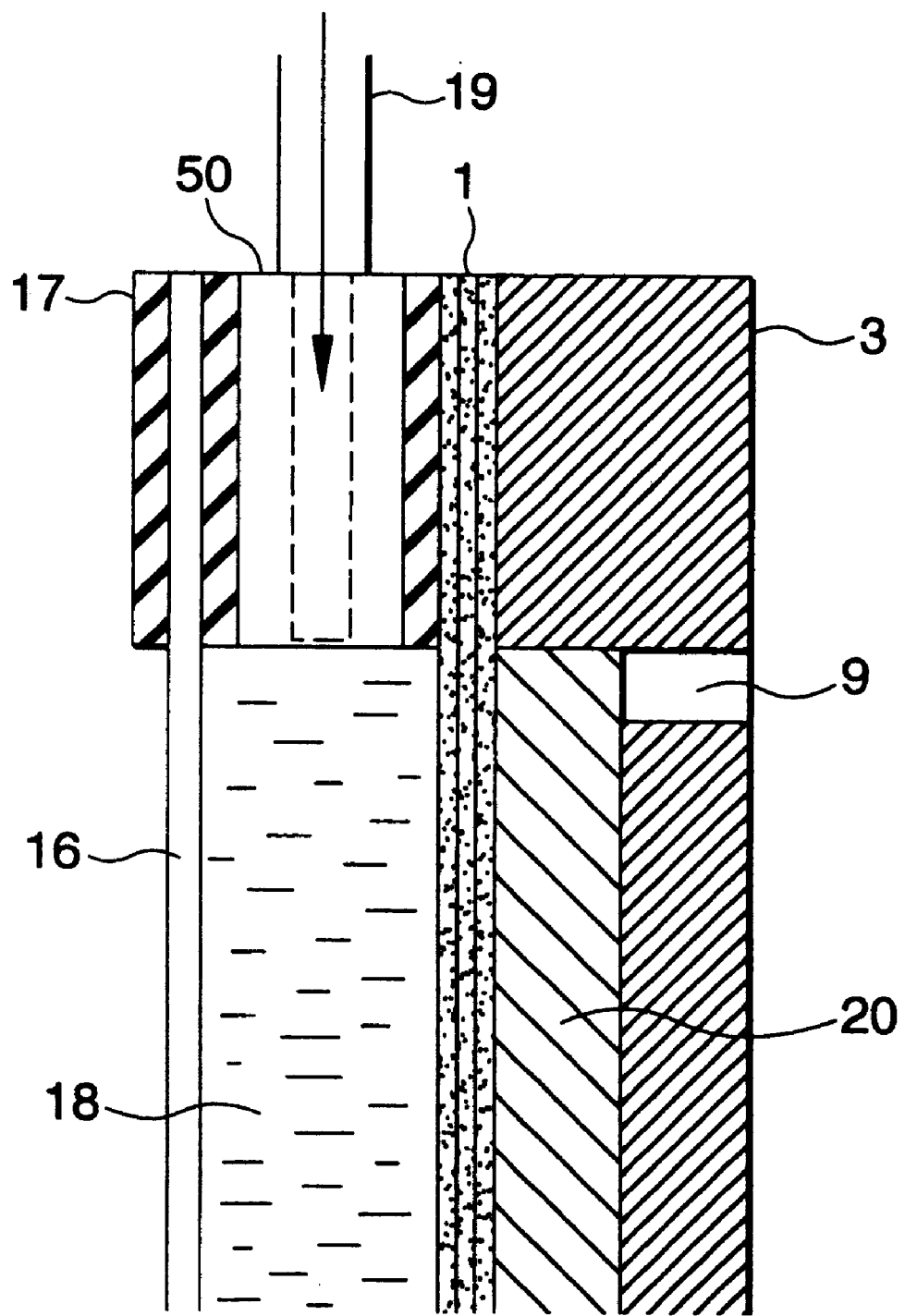
FIG. 23 is a cross section of an electrolytic cell using a conventional oxygen cathode.

FIG. 13 is a cross section of a bipolar structure unit having the metal-framed projecting gas diffusion electrode 11 incorporated into the cathode side A. Similarly to the example shown in FIG. 10, the unit has an ion-exchange membrane 16, gaskets 17, a cathode chamber 18, an electrolytic solution inlet 19, a gas chamber 20, and a gas inlet 9 as well as the metal-framed projecting gas diffusion electrode 11. The gas chamber 20 is supported by a feeder rib 21 having a T-shaped section. A bipolar plate is set as a partition making an anode side B. The anode side B is provided with an anode DSA 12.

In the above-described Examples 2 and 3, it was possible to reduce the distance between the gas diffusion electrode and the ion-exchange membrane to 1 mm or shorter, whereby the resistance loss due to the catholyte reduced to the minimum. Further, the contact resistance was reduced by joining the metal-framed projecting gas diffusion electrode to the electrolytic cell frame. As a result, it has now become to possible to greatly reduce the electrolytic cell voltage.

INDUSTRIAL APPLICABILITY

In the present invention, the gas diffusion electrode is joined to a metal frame via a silver member. Accordingly, the present invention provides a gas diffusion electrode having a metal frame or a gas chamber with which a conventional hydrogen-generating cathode is easily interchangeable to set up a sodium chloride electrolytic cell that is little liable to leak liquid or gas; and an electrolytic cell using the same.

A large-sized metal-framed gas diffusion electrode can be obtained by making a plurality of openings in the metal frame to which the gas diffusion electrode is to be joined and joining the gas diffusion electrode to each opening.

As described above, where the surface of the gas diffusion electrode projects forward over the metal frame, the surface of the gas diffusion electrode can be brought close to the ion-exchange membrane irrespective of the position of the metal frame, to thereby make the catholyte chamber sufficiently thin. Accordingly, there are provided a metal-framed projecting gas diffusion electrode which, as mounted on an electrolytic cell, can reduce a resistance loss due to the resistance of the electrolytic solution and an ion-exchange membrane type sodium chloride electrolytic cell comprising the gas diffusion electrode.

The above structure could make it possible to reduce the gap between the ion-exchange membrane and the gas diffusion electrode to zero and thereby to reduce the feed resistance to virtually zero even where the cathode chamber frame is thick. The structure also facilitates supply and withdrawal of the electrolytic solution to and from the metal frame, thereby providing a very stable oxygen cathode free from liquid leakage and gas leakage.

In the uneven sheet-joined gas diffusion electrode of the invention, a gas diffusion electrode and a metal sheet which has depressions (grooves) serving as gas passageways and projections having a silver surface are firmly joined together by superposing them on each other and hot pressing the gas diffusion electrode and the silver under conditions of 200° C. to 400° C. and 20 kg/cm$^2$ or higher. Since the electric current of the gas diffusion electrode can be collected in the thickness direction over a short distance, the voltage loss due to resisting components can be minimized. Further, the uneven sheet-joined gas diffusion electrode is prevented from protruding and breaking even when the gas pressure becomes higher than the liquid pressure. The gas diffusion electrode of this type can be applied to fuel cells or various electrolytic cells such as a sodium chloride electrolytic cell.

Where the invention is applied to remodelling of a conventional electrolytic cell, an oxygen cathode comprising the gas diffusion electrode and gas chamber is placed in the electrolytic solution of the cathode chamber. While the cell is in operation, both sides of the oxygen cathode comprising the gas diffusion electrode and gas chamber are filled with the electrolytic solution. Therefore, an equal liquid pressure is imposed to both the rear side and the front side of the oxygen cathode, producing no stressful pressure difference on the oxygen cathode. As a result, electrolysis can be performed stably for an extended period of time. Additionally, since the oxygen cathode is operated in a soaked state in liquid, the strength of the electrode does not need to be so high as long as a reaction gas is supplied stably. There is thus provided an oxygen cathode which is inexpensive and the most suited for remodelling an existing electrolytic cell.

Accordingly, a current ion-exchange membrane type sodium chloride electrolytic cell can be remodelled into an ion-exchange membrane type sodium chloride electrolytic cell using a gas diffusion electrode simply by making virtually minimum alternations.

What is claimed is:

1. A gas diffusion electrode supported by a metal frame, wherein the gas diffusion electrode is joined to the metal frame via a silver member or a member having a silver surface.

2. The gas diffusion electrode as set forth in claim 1, wherein said metal frame is an anticorrosive metal frame having two or more openings and having a gas diffusion electrode joined to each of the openings via a silver member or a member having a silver surface by hot pressing.

3. The gas diffusion electrode as set forth in claim 1, wherein said metal frame is an anticorrosive metal frame having two or more openings and having a gas diffusion electrode joined to each of the openings via a silver member or a member having a silver surface by hot pressing to make a metal-framed gas diffusion electrode, and the metal-framed gas diffusion electrode has an electrode pan made of a nickel sheet joined thereto to make a gas chamber, said gas chamber being provided with a gas inlet and a gas outlet.

4. The gas diffusion electrode as set forth in claim 1, wherein the surface of a reaction layer of said gas diffusion electrode projects forward to form a projecting surface over the level of the periphery of said metal frame.

5. The gas diffusion electrode as set forth in claim 1, having a gas chamber-integrated structure, wherein said structure is obtained by applying a metal sheet having a silver surface with a large number of grooves to the gas diffusion electrode, with the projecting surfaces of said metal sheet where said silver surface exists being in contact with the gas feed layer side of said gas diffusion electrode, and joining the silver existing on said projecting surfaces of said grooved metal sheet to said gas diffusion electrode by hot pressing so that the grooves of said metal sheet serve as gas passageways.

6. The gas diffusion electrode as set forth in claim 5, wherein said joining is carried out under hot pressing conditions at a temperature of 200 to 400° C. and a pressure of 20 kg/cm$^2$ or higher.

7. The gas diffusion electrode as set forth in claim 1, wherein said metal frame surrounds and edgewise supports the gas diffusion electrode.

8. A sodium chloride electrolytic cell comprising a gas diffusion electrode supported on a metal frame by joining the gas diffusion electrode to the metal frame via a silver member or a member having a silver surface; the gas diffusion electrode supported on the metal frame and an electrode pan made of a nickel sheet being joined to form a gas chamber; said gas chamber having a gas inlet and a gas outlet; and metallic joints of said gas diffusion electrode being bonded directly to a feeder rib and/or a cell frame of the electrolytic cell.

9. The sodium chloride electrolytic cell as set forth in claim 8, wherein said metal frame is an anticorrosive metal frame having two or more openings and having a gas diffusion electrode joined to each of the openings via a silver member or a member having a silver surface by hot pressing.

10. The sodium chloride electrolytic cell as set forth in claim 8, wherein said gas diffusion electrode supported on the metal frame has the surface of a reaction layer thereof projecting forward to provide a projecting surface over the level of the periphery of said metal frame.

11. The sodium chloride electrolytic cell as set forth in claim 8, having a gas chamber-integrated gas diffusion electrode which is constructed by applying a metal sheet having a silver surface with a large number of grooves to the gas diffusion electrode, with the projecting surfaces of said metal sheet where the silver surface exists being in contact with the gas feed layer side of said gas diffusion electrode, and joining the silver existing on said projecting surfaces of said grooved metal sheet to said gas diffusion electrode by hot pressing so that the grooves of said metal sheet serve as gas passageways.

12. The sodium chloride electrolytic cell as set forth in claim 8, wherein a cathode chamber is provided with an oxygen cathode comprising a gas diffusion electrode, a gas chamber, and a gas chamber pan and having a gas inlet and a gas outlet, and the cell is operated while a catholyte is present on both the reaction layer side and the rear gas chamber side of the oxygen cathode.

13. The sodium chloride electrode cell as set forth in claim 8, wherein said metal frame surrounds and edgewise supports the gas diffusion electrode.

* * * * *